May 31, 1938.　　　A. A. G. MAGIS　　　2,119,109
VALVE GEAR
Filed March 12, 1935　　2 Sheets-Sheet 1

INVENTOR
AUGUSTE ADELIN GUSTAVE MAGIS.
BY O. V. Thiele
ATTORNEY

Patented May 31, 1938

2,119,109

UNITED STATES PATENT OFFICE 2,119,109

VALVE GEAR

Auguste Adelin Gustave Magis, Paris, France, assignor to The Superheater Company, New York, N. Y.

Application March 12, 1935, Serial No. 10,617
In France March 13, 1934

3 Claims. (Cl. 121—157)

The present invention relates to distribution valves capable of functioning at great speed and intended especially for use in steam driven engines. The distribution of the steam is effected in the invention by poppet valves whose advantages over slide valves are well understood by technical men but whose use has heretofore been connected with difficulties. The various solutions adopted hitherto for moving the valves have been mechanical solutions, which have not been shown to be entirely satisfactory.

There has been considered in the past in steam motors the utilization of valves sufficiently large to constitute the entire end of the cylinder. Such valves offer a very large area for steam flow even with a slight lift. Furthermore, the arrangement can be such that the steam passes from the steam chest to the cylinders without change in direction and without any appreciable stratification or laning which is of prime importance in connection with motors meant to function at high speed and with good efficiency. The invention is of particular interest in connection with valves of this class but it will be understood that its application is not limited to them.

The essential characteristic of the invention is the following: Each valve is actuated by a piston which is preferably unitary with it and which in at least one direction of its movement is exposed, as to one of its faces, to a fluid under suitable pressure by means of a small mechanically actuated auxiliary valve. The auxiliary distributing valve may be a slide valve moved positively by a cam shaft, the cams of the latter having a variable profile, whereby the opening of the valve can be regulated, for example, by longitudinal displacement of the shaft.

In practice if we consider the invention applied to a multi-cylinder steam engine, the valve gear common to several alined cylinders is located in the steam supply chamber and the shaft mentioned above is itself common to the several valves.

Thus an adaptable and rapid transmission is provided between the valves and the elements which actuate them, the friction being reduced to a minimum and only small forces being necessary to accelerate the parts, since the mechanical gear has to put into motion only the auxiliary valves which are small in mass and have only a slight travel, or the actuating elements may even be reduced to a distributor shaft with rotary movement.

The actuating pressure fluid may possess lubricating properties so that leakage will be utilized to lubricate elements other than those concerned with the distribution.

The description which follows and which will make clear how the invention can be put into practice, makes reference to the attached drawings, which are to be taken as illustrative only.

Figure 1:
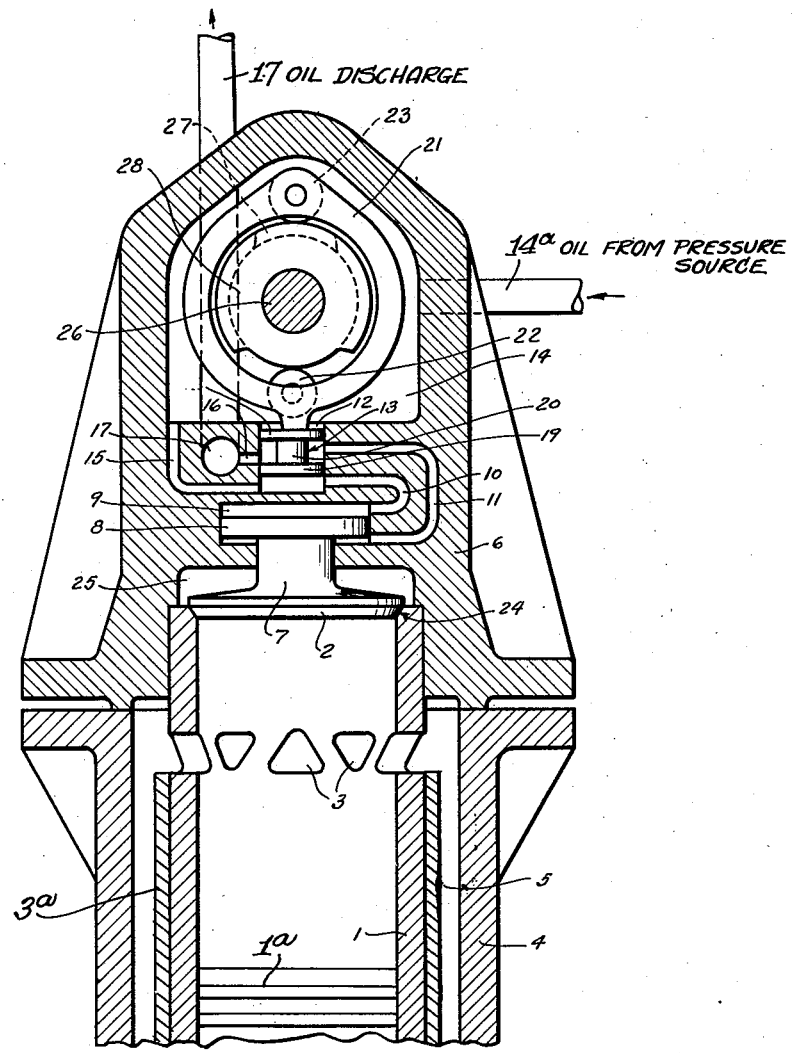
Fig. 1 represents a transverse section of an engine in accordance with the invention.

The steam engine which is shown in Fig. 1 comprises a liner 1 within which reciprocates a piston 1a. Admission is effected through the end of the cylinder, the entire end being made up by the valve 2. Exhaust of the steam occurs through the ports 3 formed in the liner 1 and controlled by a sleeve valve 3a. A cylinder body 4, which may be common to several alined cylinders, surrounds the liner and is separated from it to form a steam jacket 5 for exhaust steam.

The distributing valves are located in a housing 6 which constitutes at the same time a reservoir for oil under pressure which, just as jacket 4, may be common to several alined cylinders. The liner 1 may extend into and be fixed in this housing 6 as shown in Fig. 1. The valve 2 is connected by means of the stem 7 to a piston 8 located in a cylinder 9 whose ends are in communication by channels 10 and 11 respectively with a cylinder 12. In the latter there reciprocates a distributor piston for the valve-actuating fluid, fluid which may be oil under pressure. This oil fills the chamber 14 provided in the housing 6.

Chamber 14 communicates directly with one end of the cylinder 12 and with the other end by means of a channel 15. The cylinder 12 is also in communication by means of channel 16 with an exhaust conduit 17 formed in the body of the housing 6. The piston 13 constitutes a cylindrical distributing valve with outside admission and inside exhaust. It comprises two enlarged portions 18 and 19 connected by a reduced stem portion 20 and is rigidly connected to a frame or yoke 21 carrying rollers 22 and 23, of which more will be said below.

The yoke 21 has extending through it a cam shaft 26 carrying a pair of cams 27 which act on the yoke 21 through the rollers 23. The cams 27 have variable profiles such that successive sections taken parallel to the sheet of the drawings vary progressively in such a way that when the cam shaft is shifted longitudinally, the effective parts of the cams 27 vary in length. As these cams serve to bring about the opening of the steam valve 2, there can thus be obtained periods during which the valve is open, periods varying progressively from a predetermined minimum to a predetermined maximum. The roller 22 is not in the same plane as the rollers 23 so that it never engages cams 27.

It will be understood that there may be several rollers 22 and several rollers 23 for the steam valve 2 so that the forces will be balanced. For example, in the case illustrated, it may be assumed that the roller 22 is a single roller and that its central transverse plane coincides with the axial plane of the piston 13 and that there are two rollers 23 arranged symmetrically with respect to this same central plane.

The shaft 26 carries a cam 28 which is complementary to the cams 27 and engages the roller 22 when the cam 27 ceases its engagement with rollers 23.

Figure 2:
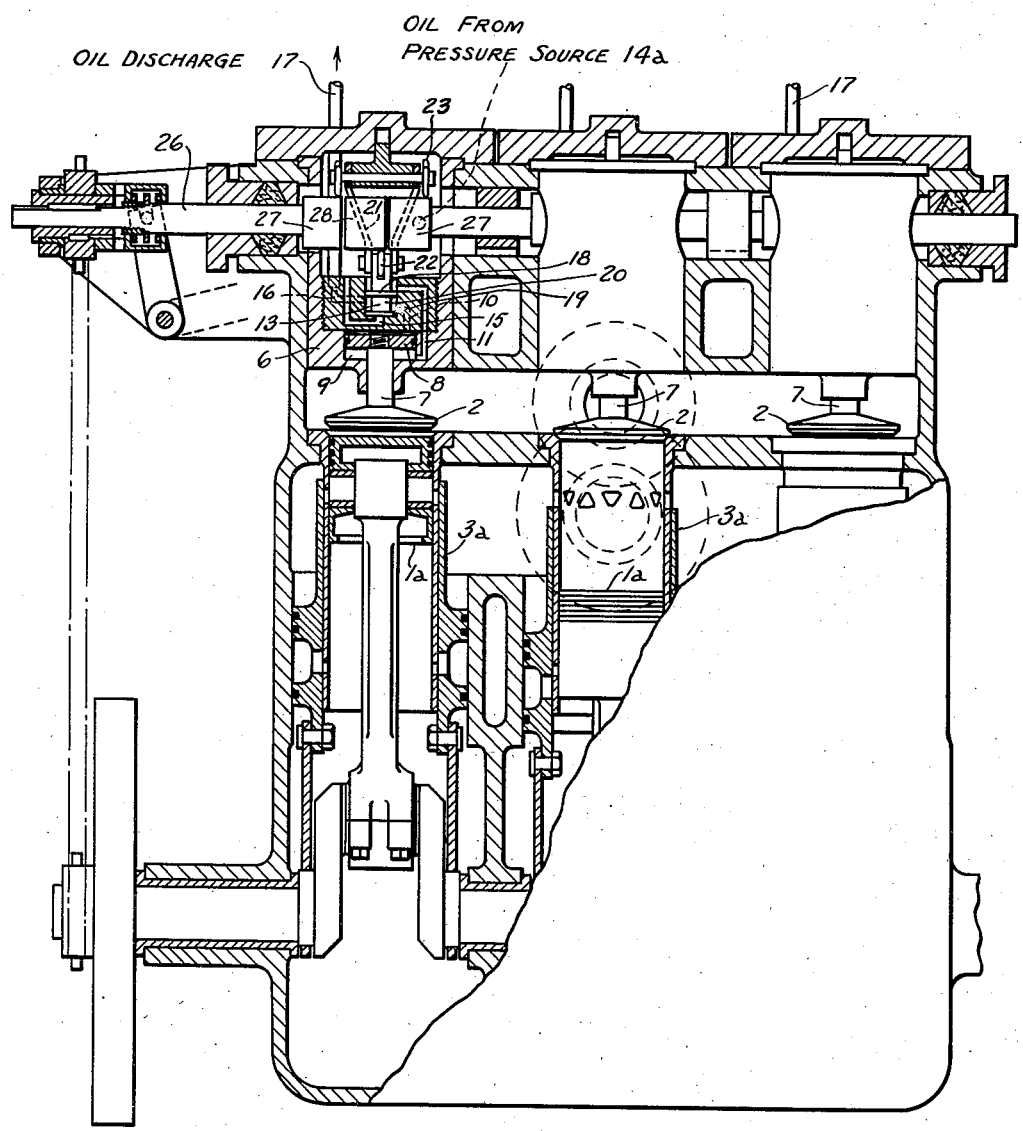
Fig. 2 is a longitudinal sectional view of a multi-cylinder engine embodying the invention.

When the rollers 22 roll on the cam 27 the piston is in its upper position as shown in the drawings. Oil under pressure supplied through pipe 14a to chamber 14 then passes from the chamber 14 through channel 15 under the distributing piston 13 and then follows the channel 10 and thus reaches the upper face of piston 8, thus closing valve 2 and keeping it closed as shown in Fig. 1. During this time the lower face of piston 8 is in communication with the exhaust through channel 11, cylinder 12, channel 16 and the oil exhaust conduit 17. On the other hand, when the roller 22 engages cam 28 to bring about the lowering of yoke 21 and distributor piston 13, the lower face of piston 8 is subjected to the action of the oil under pressure while the upper face is open to exhaust as shown in Fig. 2.

As mentioned above, the cam 28 is complementary to cams 27 and its development along the line of its contact with roller 22 will always be complementary to the development of cams 27 along their line of contact with rollers 23. The placing of one of the faces of piston 8 in communication with exhaust therefore always corresponds exactly to the placing of the other face under pressure and vice versa.

The force necessary to raise the valve 2 being only the difference between the admission pressure and compression pressure in the cylinder at the end of the compression stroke of the piston, the oil pressure may be lower than the steam pressure. Nevertheless it is preferably kept higher than the steam pressure so that the leakage of oil around the stem of the valve may serve to lubricate the engine piston, being carried along by the steam. In order to make sure that this result is brought about, a predetermined amount of clearance may purposely be provided.

The cams which make it possible to vary the duration of the steam admission are in each of their transverse sections oriented on their shafts in such a way that not only the duration of the admission but even the beginning of admission may be varied with respect to the piston stroke according to any law which one wishes to adopt.

It goes without saying that modifications in detail may be made in the engine described above without thereby losing the spirit of the invention.

What I claim is:

1. In a multi-cylinder engine; an engine block formed with longitudinally extending inlet and outlet chambers common to the power cylinders and with a fluid reservoir; a plurality of power cylinders aligned along said block and each connecting at one end thereof with said inlet chamber; individual poppet valves located at said end of each cylinder and controlling the admission of actuating fluid to the latter from said inlet chamber; a plurality of pistons having stems connecting them to said poppet valves in coaxial relation; ducts leading to each side of each piston; pilot valves individual to the ducts for the respective pistons and operating in chambers connecting with said fluid reservoir, with the related ducts, and with fluid exhaust means for controlling said related ducts to alternately connect either side of the corresponding piston with said reservoir and simultaneously connect the other side thereof with said exhaust means; a camshaft extending along said block and provided with cams individual to and operatively connected with said pilot valves for operating the latter; and means for supplying fluid to and maintaining it under pressure in said reservoir.

2. In a multi-cylinder engine; an engine block formed with longitudinally extending inlet and outlet chambers common to the power cylinders and with a fluid reservoir; a plurality of power cylinders aligned along said block and each connecting at one end thereof with said inlet chamber; individual poppet valves located at said end of each cylinder and controlling the admission of actuating fluid to the latter from said inlet chamber; a plurality of pistons having stems connecting them to said poppet valves in coaxial relation; ducts leading to each side of each piston; pilot valves individual to the ducts for the respective pistons and operating in chambers connecting with said fluid reservoir, with the related ducts, and with fluid exhaust means for controlling said related ducts to alternately connect either side of the corresponding piston with said reservoir and simultaneously connect the other side thereof with said exhaust means; a camshaft extending along said block and through said reservoir therein; cams individual to and operatively connected with said pilot valves for operating the latter; and means for supplying a fluid lubricant to and maintaining it under pressure in said reservoir, the stems connecting said pistons to said poppet valves being arranged so that lubricating fluid may flow therealong to said poppet valves and power cylinders.

3. In a multi-cylinder engine; an engine block formed with an exhaust chamber, a fluid reservoir above the latter and an inlet chamber intermediate said reservior and exhaust chamber, said reservoir and chambers extending along said block; a plurality of power cylinders aligned along the block and extending through said exhaust chamber with their upper ends in communication with said inlet chamber; individual poppet valves located at the upper end of each cylinder and controlling the admission of actuating fluid to the latter from said inlet chamber; a plurality of pistons in said block above said poppet valves and having stems connecting them thereto in co-axial relation; ducts in said block leading to each side of each piston; pilot valves individual to the ducts for the respective pistons and operating in chambers positioned above the respective cylinders and connecting with said fluid reservoir, with related ducts and with fluid exhaust means for controlling said related ducts to alternately connect either side of the corresponding piston to said reservoir and simultaneously connect the other side thereof to said exhaust means; means for supplying fluid to and maintaining it under pressure in said reservoir; a chamshaft extending along said block above said pilot valves and provided with cams individual to and operatively connected with the latter for actuating them to control the supply of pressure fluid to said pistons for operating said poppet valves.

AUGUSTE ADELIN GUSTAVE MAGIS.